United States Patent [19]

Nakano et al.

[11] Patent Number: 5,003,407
[45] Date of Patent: Mar. 26, 1991

[54] APPARATUS FOR SELECTIVELY REPRODUCING A VIDEO SIGNAL AND A DIGITIZED AUDIO SIGNAL RECORDED ON A RECORD MEDIUM WITH ONE OF A PLURALITY OF RECORDING DENSITIES

[75] Inventors: Kenji Nakano, Kanagawa; Noboru Murabayashi, Tokyo, both of Japan

[73] Assignee: Sony Corporation, Tokyo, Japan

[21] Appl. No.: 258,475

[22] Filed: Oct. 17, 1988

[30] Foreign Application Priority Data

Oct. 21, 1987 [JP] Japan .................................. 62-65853

[51] Int. Cl.⁵ ............................................ H04N 5/782
[52] U.S. Cl. ............................................ 360/19.1
[58] Field of Search ................... 369/47, 48; 360/19.1, 360/32, 27, 33.1; 358/343, 335

[56] References Cited

U.S. PATENT DOCUMENTS

| | | | |
|---|---|---|---|
| 4,551,771 | 11/1985 | Machida | 360/19.1 |
| 4,577,180 | 3/1986 | Fakuda | 341/73 |
| 4,583,132 | 4/1986 | Nakano | 358/343 |
| 4,617,552 | 10/1986 | Kojima | 341/68 |
| 4,688,110 | 8/1987 | Fricke | 358/343 |

Primary Examiner—Donald McElheny, Jr.
Attorney, Agent, or Firm—Alvin Sinderbrand; William S. Frommer

[57] ABSTRACT

In an apparatus, for example, an 8-mm format VTR, for selectively reproducing video data and digital data, such as, PCM audio data, recorded on a magnetic medium with any one of a plurality of recording densities, the recording density of the digital data is detected on the basis of a characteristic of the reproduced digital data, such as, a characteristic clock frequency regenerated therefrom, and the processing to which the reproduced digital data is subjected is selected automatically in accordance with the detected recording density thereof, thereby facilitating the use of the apparatus for reproducing digital data recorded with different densities.

12 Claims, 8 Drawing Sheets

APPARATUS FOR SELECTIVELY REPRODUCING A VIDEO SIGNAL AND A DIGITIZED AUDIO SIGNAL RECORDED ON A RECORD MEDIUM WITH ONE OF A PLURALITY OF RECORDING DENSITIES

BACKGROUND OF THE INVENTION

1. Field Of The Invention

This invention relates generally to information reproducing apparatus and, more particularly, is directed to an apparatus suitable for reproducing digital data recorded on a magnetic recording medium.

2. DESCRIPTION OF THE PRIOR ART

It is known to employ an 8-mm format video tape recorder (VTR) as an apparatus for the play back or reproducing of digital data recorded on a magnetic tape. In such 8-mm format VTR, an FM audio signal is interposed between the frequency band of a FM luminance signal and the frequency band of a low-frequency converted chrominance signal, and the resulting combined signal which is hereinafter simply referred to as a video signal is recorded in video track portions $TR_{VD}$ constituting the main portions of successive slant record tracks TRA and TRB which are disposed alternately on a magnetic tape 1, as shown on FIG. 7. In order to record and/or reproduce audio signals of higher quality, in the 8-mm format VTR, the audio signals are PCM-encoded, time-base compressed and recorded in so-called overscan or audio track portions $TR_{AD}$ situated at one of the end portions of the slant tracks TRA and TRB. A particular type of modulation used to record the time-compressed, PCM-encoded audio signals is bi-phase-mark modulation, for example, as described in detail in U.S. Pat. No. 4,551,771, issued Nov. 5, 1985, and having a common assignee herewith. As shown in FIG. 8A, in bi-phase-mark modulation, frequency signals $S_1$ and $S_2$ having frequencies $f_1$, for example, of 2.9 MHz, and $f_2$, for example, of 5.8 MHz, are recorded as digital data on the magnetic tape while maintaining a phase relationship in which their zero cross points coincide with each other. For example, when a PCM audio signal is at logic "L", the frequency signal $S_1$ having the low frequency $f_1$ is recorded, whereas, when the PCM audio signal is at logic "H", the frequency signal $S_2$ having the high frequency $f_2$ is recorded on the magnetic tape.

Figure 8A:
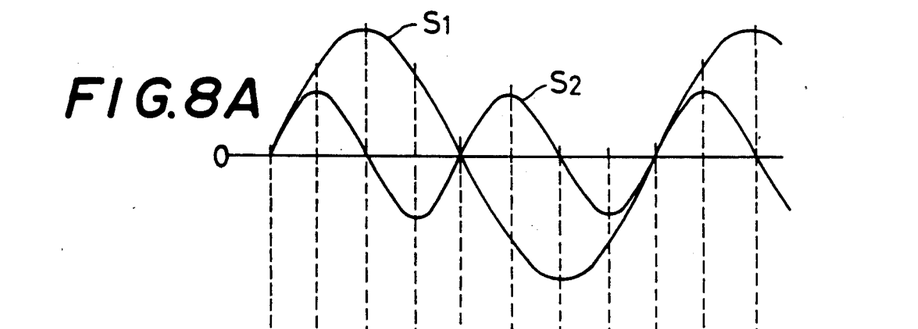
FIGS. 8A, 8B and 8C are waveforms to which reference is made in describing the reproducing of a signal which has been bi-phase-mark modulated.
Figure 8B:
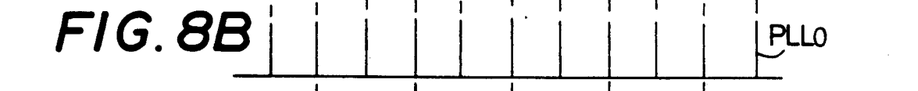
Figure 8C:
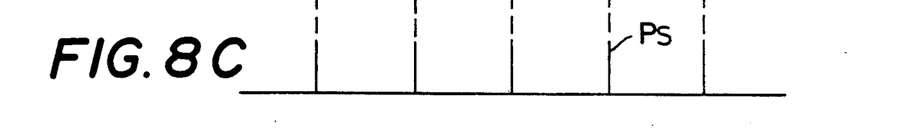

When an audio signal recorded in an audio track portion $TR_{AD}$ is reproduced or played back, the zero cross points of the picked-up frequency signal $S_1$ or $S_2$ are detected, as shown in FIG. 8B. In response to such detection, for example, a sampling pulse oscillator with a phase locked loop (PLL) arrangement is made to oscillate and thereby provide output pulses $PLL_0$ which are phase shifted 45° from the frequency signal $S_1$ having the low frequency $f_1$, or phase shifted 90° from the frequency signal $S_2$ having the high frequency $f_2$. Those of the output pulses $PLL_0$ generated at the phase angles of 35°, 135°, 225° and 315° of the frequency signal $S_1$ are used as sampling pulses $P_S$ (FIG. 8C) for sampling the reproduced data. When every other two of the resulting sampled values are positive, it is determined that the respective reproduced data is at the logic level "L". Further, those of the output pulses $PLL_0$ generated at the 90° and 270° phase angles of the frequency signal $S_2$ are also used as sampling pulses $P_S$ for sampling the reproduced data and, when every other of these sampled values are positive, it is determined therefrom that the respective reproduced data is at the logic level "H". The reproducing of bi-phase-mark modulated data is further described in U.S. Pat. No. 4,542,418, issued Sept. 17, 1985, and having a common assignee herewith. Furthermore, an audio PCM signal reproducing circuit in which the equalizing function is automatically changed-over in response to the characteristic of the recorded tape is disclosed in U.S. Pat. No. 4,841,385, issued June 20, 1989, and corresponding to EPO laid-open Publication No. 0264228, which also has a common assignee herewith.

Figure 9:
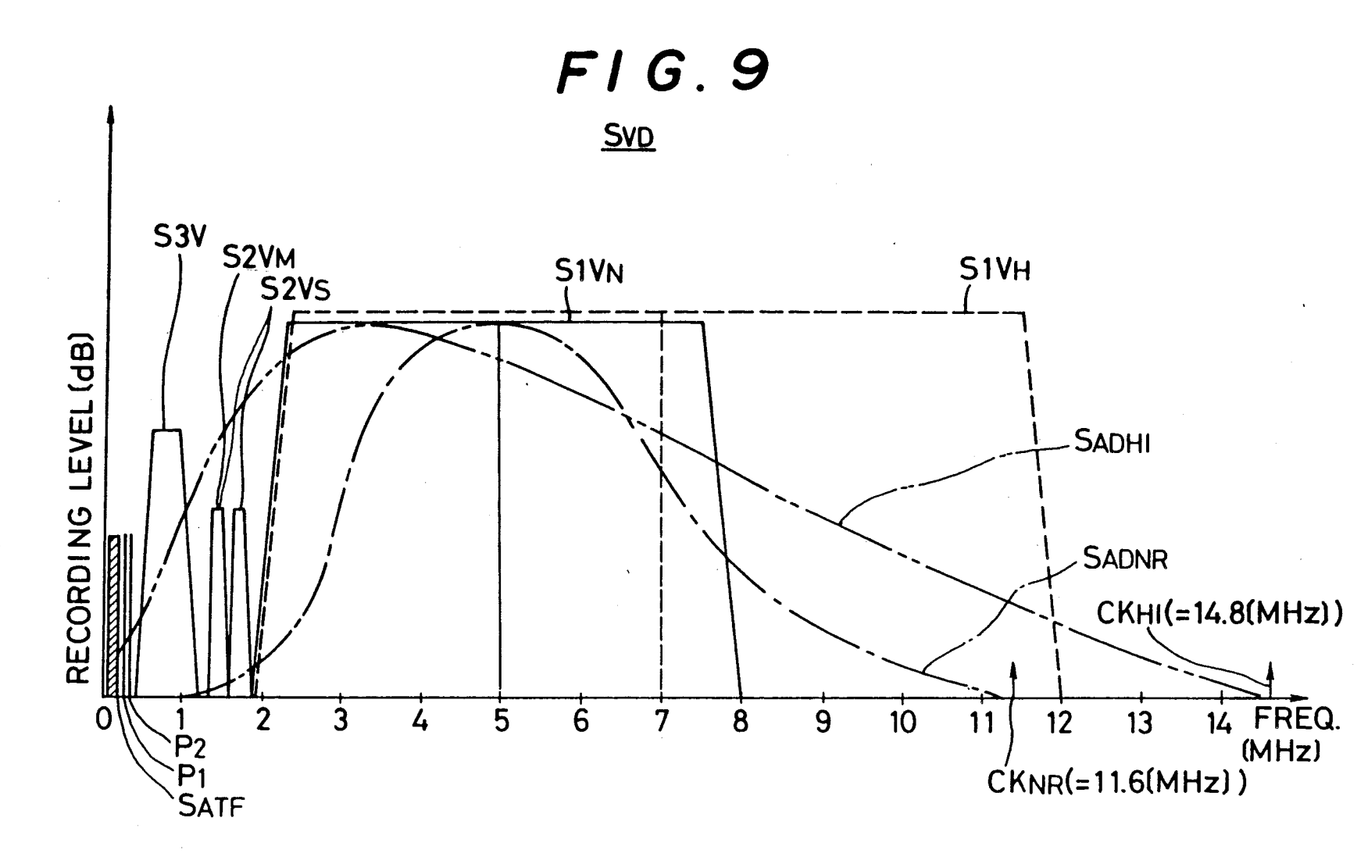
FIG. 9 is a graph showing the frequency spectra of various components that may be included in a signal to be recorded and/or reproduced by the apparatus embodying this invention.

As shown more specifically in FIG. 9, the video signal $S_{VD}$ recorded in the video track portion $TR_{VD}$ of each of the tracks TRA and TRB is known to include an FM luminance signal, for example, as indicated at $S1V_N$, a low frequency or down-converted chrominance signal S3V, and an FM audio signal, for example, as indicated at $S2V_M$ interposed between the frequency bands of the signals $S1V_N$ and S3V. An automatic track follower (ATF) signal $S_{ATF}$ is superposed on the signal $S_{VD}$ for recording therewith in each video track portion $TR_{VD}$. The same rotary magnetic head used for recording the signal $S_{VD}$ in each video track portion $TR_{VD}$ is also used for recording the PCM audio signal $S_{ADNR}$ in the audio signal portion $TR_{AD}$ of the respective track. The frequency spectrum of the PCM audio signal $S_{ADNR}$ is shown on FIG. 9 to have a peak value at a frequency which substantially coincides with the center frequency of the FM luminance signal $S1V_N$. Further, the PCM audio signal $S_{ADNR}$ has a frequency characteristic in which the signal level nears zero in the high and low frequency ranges of the signal $S_{VD}$. By reason of the foregoing, the same degrees of azimuth loss are obtained when one of the rotary magnetic heads reproduces the signal $S_{VD}$ and the PCM audio signal $S_{ADNR}$ recorded in respective portions $TR_{VD}$ and $TR_{AD}$ of the same slant track. Therefore, the PCM audio signal $S_{ADNR}$ can be recorded without guard bands between adjacent tracks so long as the two rotary magnetic heads provided for recording and reproducing signals in the adjacent tracks TRA and TRB, respectively, have gaps with different azimuth angles for substantially minimizing cross talk between the PCM audio signals recorded in such adjacent tracks.

Depending upon the application thereof, digital data recorded on a magnetic recording medium may have different sampling frequencies. Therefore, recording media of different types are used for recording digital data having respectively different recording densities. It is apparent that, if a reproducing or playback apparatus can be adapted for reproducing data from the different types of tapes having respectively different recording densities, the uses of such play back apparatus will be accordingly extended. Thus, for example, it is advantageous to provide an 8-mm VTR capable of use with first and second types of recording media, in which the first type of recording medium records PCM audio data having a standard digital information content sampled at a standard sampling frequency, while the second type of recording medium records PCM audio data having a relatively larger content of high-quality digital data sampled at a frequency that is a predetermined multiple of the standard sampling frequency. If these first and second types of recording media can be reproduced in a common 8-mm VTR, that is, the same apparatus can be used for reproducing a standard-quality audio signal from the first type of recording medium and for reproducing a high-quality audio signal from the second type of recording medium, such 8-mm VTR will have a substantially expanded utility.

However, the reproducing apparatus heretofore available has required the user to determine whether the recording medium about to be played back or reproduced is recorded with standard- or high-quality PCM audio or other digital data, and, after making such determination, to select the appropriate processing circuits. Thus, the known reproducing apparatus is relatively inconvenient in that it requires the user thereof to adapt the apparatus for the playback of the type of recording medium in question, and in so doing is susceptible to errors on the part of the user.

OBJECTS AND SUMMARY OF THE INVENTION

Accordingly, it is an object of this invention to provide an apparatus for selectively reproducing PCM audio or other digital data recorded on a recording medium with a standard-quality or high-quality recording density, and which avoids the previously mentioned disadvantages of the prior art.

More specifically, it is an object of this invention to provide a reproducing apparatus, as aforesaid, which detects whether the PCM audio or other digital data has been recorded on a recording medium with a standard-quality recording density or with a high-quality recording density, and which, in response to such detection, can automatically provide for the processing of the reproduced digital data by an appropriate processing circuit.

Still another object is to provide an apparatus, as aforesaid, which is further operative to reproduce an information signal recorded on a magnetic record medium, and which may include, in addition to the digital data constituting a standard-quality PCM audio signal or a high-quality PCM audio signal, an FM standard video signal or an FM high-quality video signal differing in their center frequencies, and an FM monaural or stereo audio signal which is frequency multiplexed with the FM video signal.

In accordance with an aspect of this invention, in an apparatus, such as, an 8-mm format VTR, for selectively reproducing video data and digital data, such as, a PCM audio signal, recorded on a magnetic medium with any one of a plurality of recording densities, the recording density of the digital data is detected on the basis of a characteristic of the reproduced digital data, such as, a characteristic clock frequency regenerated therefrom, and the processing to which the reproduced digital data is subjected is selected automatically in accordance with the detected recording density thereof, thereby facilitating the use of the apparatus for reproducing digital data recorded with different densities.

The above, and other objects, features and advantages of the invention, will be apparent in the following detailed description of an illustrative embodiment thereof which is to be read in connection with the accompanying drawings, in which corresponding parts or elements are identified by the same reference numerals in the several views.

DESCRIPTION OF THE PREFERRED EMBODIMENT

Referring to the drawings in detail, and initially to FIG. 1 thereof, it will be seen that a recording and/or play back or reproducing apparatus 10 according to an embodiment of this invention is thereshown applied to an 8-mm format VTR in which a pair of magnetic heads 12A and 12B (hereinafter referred to as the A and B heads) on a rotary drum 11 helically scan a magnetic tape 1 wrapped about the drum. As has been earlier described with reference to FIG. 7, as the tape 1 is longitudinally advanced in the direction of the arrow a and the heads 12A and 12B are rotated in the direction of the arrow b on FIG. 1, the A and B heads 12A and 12B sequentially and alternately scan slant record tracks TRA and TRB, respectively. As shown on FIG. 1, the heads 12A and 12B are substantially diametrically opposed on the drum 11 and the tape 1 is wrapped about the drum 11 over an angular extent exceeding 180°. As earlier mentioned with reference to FIG. 7, each of the tracks TRA and TRB includes a main or video track portion $TR_{VD}$ which corresponds to the scanning of the respective track by the rotary head 12A or 12B while moving with the drum 11 through an angle of 180°, and an overscan or audio track portion $TR_{AD}$ which is scanned by the respective head 12A or 12B during the remainder of its scanning movement in contact with the magnetic tape 1.

The A and B heads 12A and 12B are connected to a PCM audio signal processing section 13, a video signal processing section 14, an ATF signal processing section 15 for automatic track following, and a mode detect/control section 16 through a video/audio switch circuit 26. The apparatus 10 embodying this invention is further shown to generally comprise a system controller 100, for example, a microprocessor or the like which provides various control signals hereinafter described in detail and represented generally at $S_{CONT}$ on FIG. 1.

In a recording mode of the apparatus 10, a signal $S_{VD}$ and an ATF signal $S_{ATF}$ from the video signal processing section 14 and the ATF signal processing section 15, respectively, are superposed and recorded in the main or video track portion $TR_{VD}$ of each slant record track TRA or TRB. A PCM audio signal $S_{AD}$ output from the PCM audio signal processing section 13 is recorded in the audio track portion $TR_{AD}$ of each slant track.

The PCM audio signal processing section 13 is shown on FIG. 2 to include an audio data processing unit 13A and a recording/play back circuit 13B which are controlled by the control signals $S_{CONT}$ from the system controller 100 and by selection signals $S_{SEL}$ supplied from the mode detect/control section 16, as hereinafter described.

Figure 1:
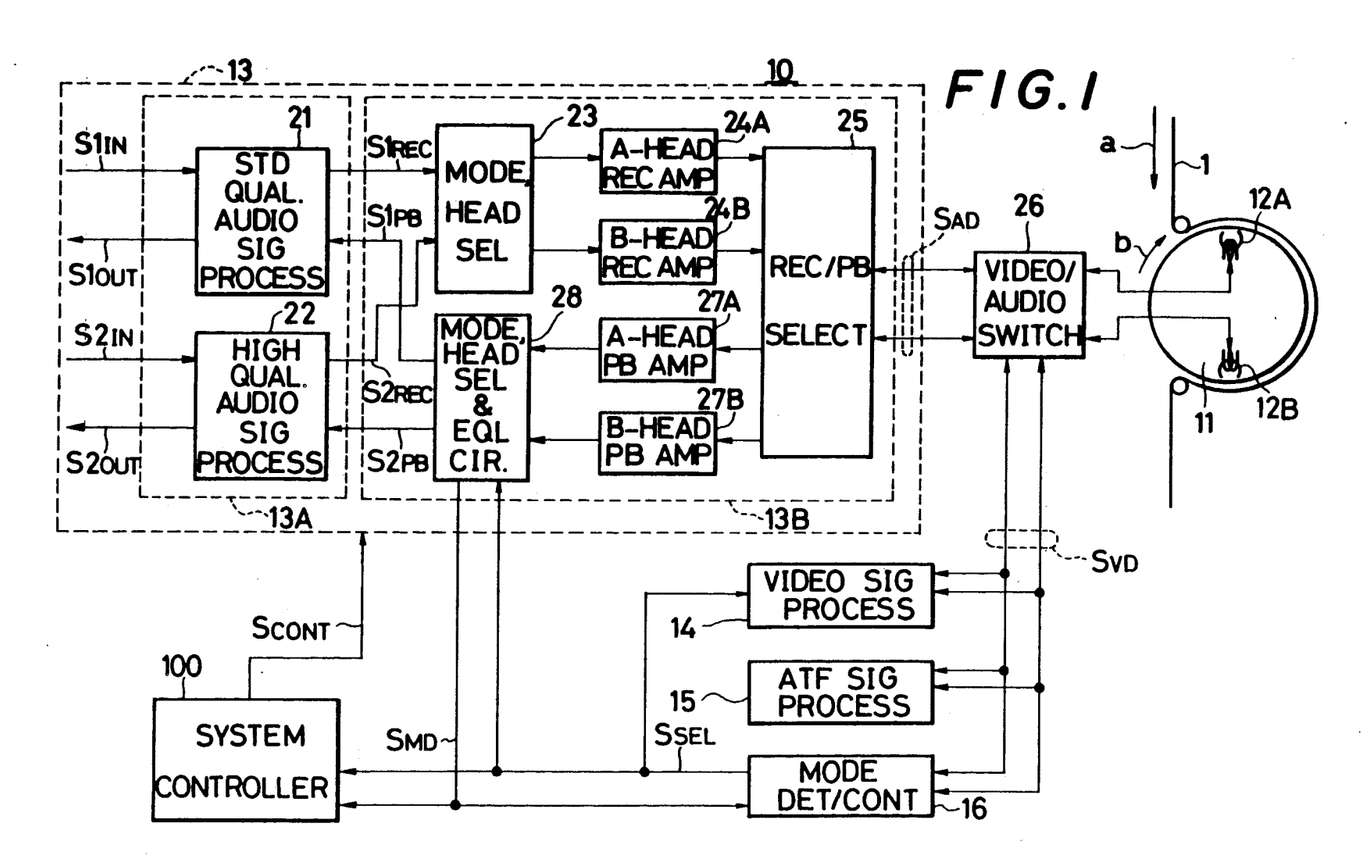
FIG. 1 is a block diagram of a recording and reproducing or play back apparatus in accordance with an embodiment of the present invention.

The audio data processing unit 13A is shown on FIG. 1 to include a standard-quality audio signal processing circuit 21 and a high-quality audio signal processing circuit 22. In the recording mode, either recording audio data $S1_{REC}$ formed by the processing circuit 21 in correspondence to an analog audio input signal $S1_{IN}$, or recording audio data $S2_{REC}$ formed by the processing circuit 22 in correspondence to a second analog audio input signal $S2_{IN}$, are supplied to a mode/head selector circuit 23 included in the recording/play back circuit 13B. The mode/head selector circuit 23 selects one of the recording audio data $S1_{REC}$ and $S2_{REC}$ in accordance with the establishment of a standard-quality recording mode or a high-quality recording mode, respectively. The selected data $S1_{REC}$ or $S2_{REC}$ to be recorded in the audio track portions $TR_{AD}$ of the slant tracks TRA and TRB are supplied through an A-head recording amplifier circuit 24A and a B-head recording amplifier circuit 24B, respectively, to a recording/play back selector circuit 25.

Figure 7:
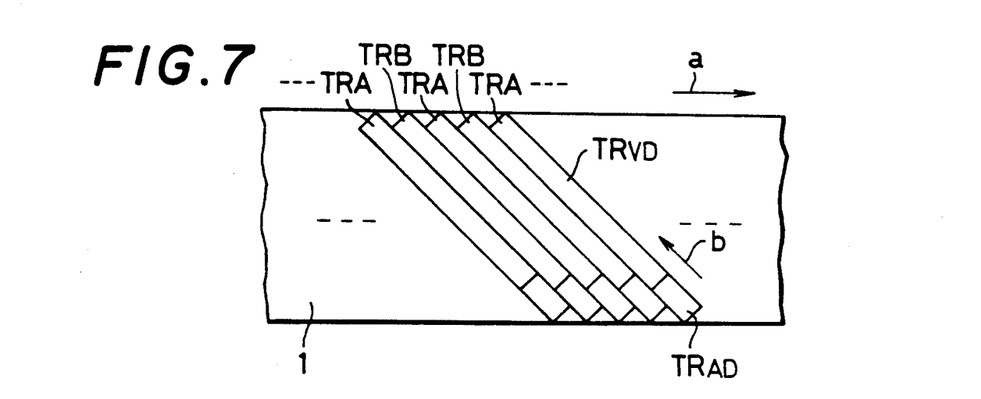
FIG. 7 is a schematic view of a length of magnetic tape on which a pattern of record tracks is illustrated.

The selector circuit 25 and the video/audio switch circuit 26 cooperate to sequentially supply the digital audio data from the A-head recording amplifier circuit 24A and the B-head recording amplifier circuit 24B to the A-head 12A and the B-head 12B, respectively, during suitably timed intervals so as to constitute the audio data $S_{AD}$ recorded in the audio track portions $TR_{AD}$ of the slant tracks TRA and TRB, respectively (FIG. 7). The video/audio switch circuit 26 similarly cooperates with the video signal processing circuit 14 and is suitably timed so that the rotary heads 12A and 12B record fields or other specified intervals of the video signal $S_{VD}$ in the video signal portions $TR_{VD}$ of the slant tracks TRA and TRB, respectively.

In the play back or reproducing mode, the video/audio switch circuit 26 and the record/play back circuit 25 direct the audio signal $S_{AD}$ reproduced by the A and B heads 12A and 12B from the audio track portions $TR_{AD}$ of the tracks TRA and TRB, respectively, through an A-head play back amplifier 27A and a B-head play back amplifier 27B to a mode/head selector and equalizer circuit 28. The mode/head selector and equalizer circuit 28 selectively fetches the reproduced audio signal from the A-head or B-head play back amplifier 27A or 27B, and performs a predetermined equalizing process thereon in accordance with the established play back mode of the apparatus, that is, whether the apparatus is in its standard-quality play back mode or in its high-quality play back mode. Then, play back audio data $S1_{PB}$ or $S2_{PB}$ is selectively supplied from the circuit 28 to the standard-quality audio signal processing circuit 21 or the high-quality audio signal processing circuit 22, respectively, once again in dependence on the established play back mode of the apparatus. The operative audio signal processing circuit 21 or 22 converts the reproduced audio data $S1_{PB}$ or $S2_{PB}$, respectively, into an analog signal which is output from the circuit 21 or 22 as a first or second audio output signal $S1_{OUT}$ or $S2_{OUT}$, respectively.

In the embodiment of the invention being here described, the audio signal processing circuit 21 samples the respective input audio signal $S1_{IN}$ at a standard sampling frequency, for example, a sampling frequency of $2f_H=31.5$ KHz, for converting the input audio signal $S1_{IN}$ into 10-bit PCM digital data. A CRCC (cyclic redundancy check code) error code is added to such digital data, and the number of bits of the digital data is compressed by 10-8 bit conversion or compression. The 10-8 bit conversion or compression is preferably effected in a non-linear encoder or compressor which effects non-linear quantization for reducing quantizing noise. The resulting compressed data is subjected to bi-phase-mark modulation at a clock frequency $CK_{NR}$, for example, of 11.6 MHz, for forming the recording audio data $S1_{REC}$ which is output from the circuit 21 and which consists of two frequency signals $S_1$ and $S_2$ (FIG. 8A) having, for example, the frequencies $f_1=2.9$ MHz and $f_2=5.8$ MHz, respectively.

In the standard-quality play back mode, the audio signal processing circuit 21 bi-phase-mark demodulates the reproduced audio data $S1_{PB}$ and effects error correction by means of the CRCC error code. The circuit 21 further effects interpolation of the audio data and then performs 10-8 inverse conversion, whereupon the resulting data is D/A converted so as to provide the audio output signal $S1_{OUT}$. It will be appreciated that the standard-quality audio signal processing circuit 21 may be substantially the same as the circuit disclosed for similar purposes in the previously mentioned U.S. Pat. No. 4,551,771.

In the high-quality recording mode of the apparatus 10, the high-quality audio signal processing circuit 22 samples the respective audio input signal $S2_{IN}$ at a high-quality sampling frequency, for example, of $3f_H=48$ KHz, which is higher than the standard sampling frequency, so as to obtain 16-bit PCM digital data. Then a CIRC (Cross Interleaved Reed-Solomon Code) error code is added to the digital data, whereupon the digital data and the error code added thereto are compressed. The compressed data is then 8-10 modulated and NRZI, (Non-Return to Zero Inverted) converted at a clock frequency $CK_{HI}=14.8$ MHz (that is, the Nyquist frequency $f_{NYH}=7.4$ MHz), whereby the data is modulated into a data string which is not easily influenced by DC level shift. The converted data string is output from the circuit 22 as the second recording audio data $S2_{REC}$. The foregoing 8-10 modulation of the compressed data is a kind of group coded modulation in which, with $N=8$ and $M=10$, the data bits are segmented into N-bit blocks, each N-bit block is converted to an M-bit data string or code, and $2^N$ patterns or codes are selected from the converted $2^M$ patterns or codes for reducing the DC and low frequency components in the frequency spectrum of the modulated signal. A modulation system similar to the foregoing 8-10 modulation is described in detail in the previously mentioned U.S. Pat. No. 4,577,180, and in U.S. Pat. No. 4,617,552, issued Oct. 14, 1986, and also having a common assignee herewith.

In the high-quality play back mode of the apparatus 10, the audio signal processing circuit 22 effects NRZI decoding and 8-10 demodulation of the reproduced audio data $S2_{PB}$ supplied thereto. Further, the demodulated data is subjected to error correction by means of the CIRC error code and, thereafter, the corrected data is subjected to interpolation and then converted to the analog audio signal $S2_{OUT}$ which is output from the circuit 22.

A sampling circuit having a sampling frequency of 48 KHz and a circuit for processing 16-bit PCM digital data, as described above in respect to the processing circuit 22, are available, for example, such circuits may be of the types presently employed in rotary-head digital audio tape recorders (R-DAT).

Figure 2:
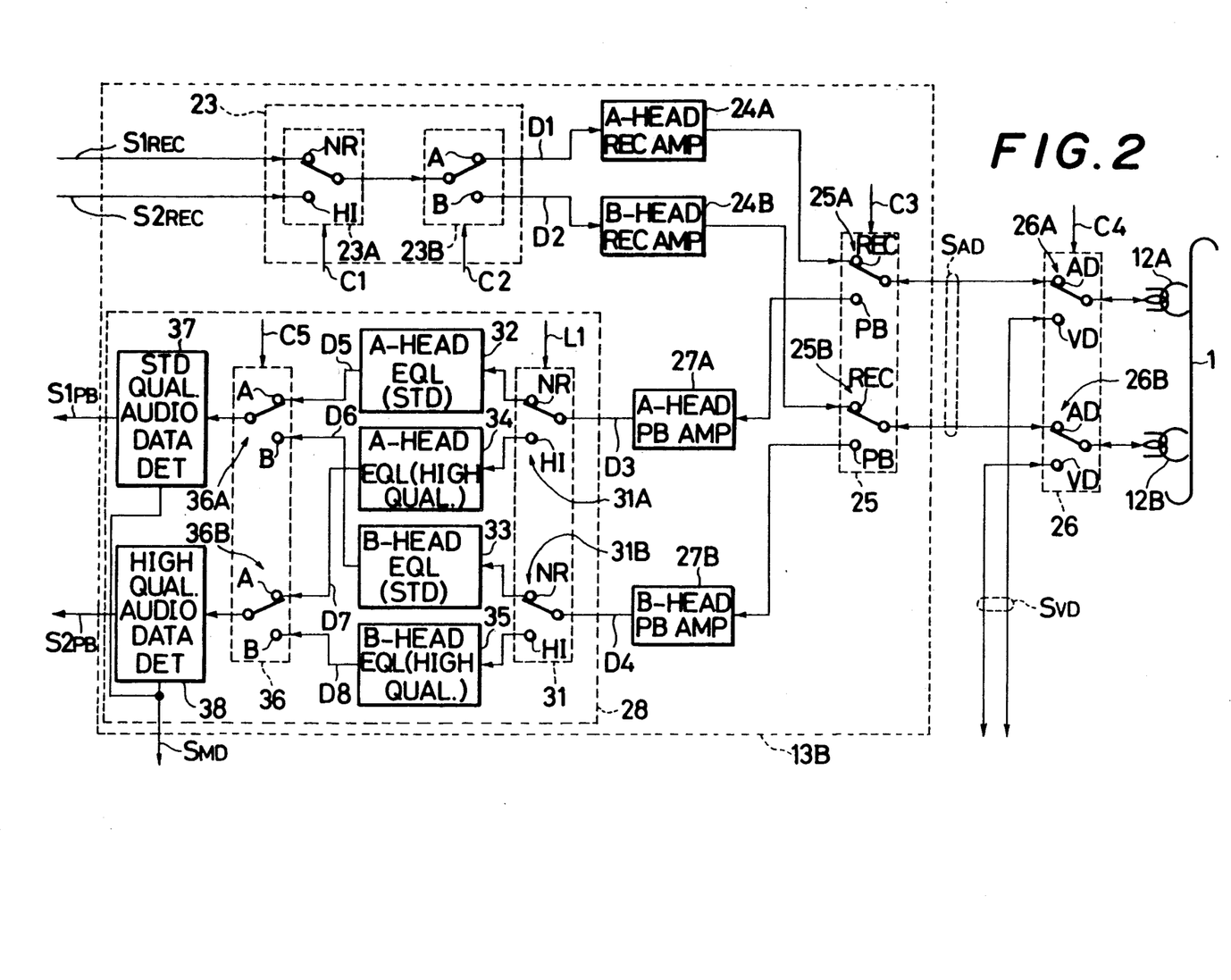
FIG. 2. is a block diagram of a circuit included in the apparatus of FIG. 1 for recording and reproducing digital audio signals.

The recording audio data $S1_{REC}$ and $S2_{REC}$ obtained from the audio signal processing circuits 21 and 22, respectively, are supplied to standard- and high-quality input terminals NR and HI, respectively, of a mode selecting switch circuit 23A included in the mode/head selector 23, as shown in FIG. 2. The mode selecting switch circuit 23A is controlled by a mode designating or establishing signal C1 included in the control signals $S_{CONT}$ provided by the system controller 100. When the signal C1 designates the standard-quality recording mode, the mode selecting switch circuit 23A engages its input terminal NR, as shown on FIG. 2, so that the audio data $S1_{REC}$ is supplied through the mode switch circuit 23A to a head switching circuit 23B which is also included in the mode/head selector 23. On the other hand, when the signal C1 designates the high-quality recording mode, the mode switching circuit 23A is made to engage its terminal HI so that the audio data $S2_{REC}$ is supplied through the mode switch circuit 23A to the head switching circuit 23B. The head switching circuit 23B is changed over or controlled so as to alternately engage its output terminals A and B by a head switching signal C2 also included in the control signals $S_{CONT}$ from the system controller 100. Thus, the audio data supplied to the head switching circuit 23B is alternately output from the terminal A or B thereof as recording data D1 or D2, respectively.

The recording data D1 is amplified by the A-head recording amplifier 24A and supplied therefrom to a terminal REC of a record/play back switch 25A of the record/play back selector 25. Similarly, the recording data D2 from the terminal B of the head switch circuit 23B is amplified by the B-head recording amplifier 24B and then applied to a terminal REC of a record/play back switch 25B of the selector 25. The record/play back switches 25A and 25B are shown to be controlled by a record/play back control signal C3 included in the control signals $S_{CONT}$ from the system controller 100 so that the switches 25A and 25B engage their respective REC terminals as shown on FIG. 2, when the apparatus 10 is in a recording mode, and so that switch circuits 25A and 25B have their moveable contacts changed-over to engage respective terminals PB when the apparatus is in a reproducing or play back mode.

The moveable contacts of the record/play back switches 25A and 25B are shown to be connected to terminals AD of video/audio change-over switches 26A and 26B which are included in the video/audio selector 26 and have their moveable contacts connected to the A-head 12A and the B-head 12B, respectively. The video/audio change-over switches 26A and 26B are controlled in response to a video/audio switching signal C4 which is also provided among the control signals $S_{CONT}$ from the system controller 100.

The video/audio change-over switches 26A and 26B are conditioned by the video/audio switching signal C4 included int eh control signals $S_{CONT}$ from the system controller 100 so as to engage their respective contacts or terminals AD during the intervals when the heads 12A and 12B are scanning the overscan or audio track portions $TR_{VD}$ of the tracks TRA and TRB, respectively. On the other hand, during scanning of the main or video track portions $TR_{VD}$ of the tracks TRA and TRB by the heads 12A and 12B, respectively, the video/audio change-over switches 26A and 26B are respectively changed-over to engage their terminals VD which are connected to the video signal processing section 14, the ATF signal processing section 15 and the mode detect/control section 16.

With the above described arrangement of the apparatus 10, in the standard-quality recording mode, the standard-quality PCM audio signal $S_{ADNR}$ which is sampled at the standard sampling frequency in the standard-quality audio signal processing circuit 21 is recorded in the overscan or audio track portion $TR_{AD}$ of each of the tracks TRA and TRB at a standard recording density. In the high-quality PCM recording mode, the high-quality PCM audio signal $S_{ADHI}$ which is sampled at a high-quality sampling frequency in the high-quality audio signal processing circuit 22 is similarly recorded, but at a higher recording density than the standard recording density.

In the play back mode, the A-head 12A and the B-head 12B pick up the PCM audio signal $S_{AD}$ from the overscan or audio track portions $TR_{AD}$ of the tracks TRA and TRB, respectively. The reproduced signal $S_{AD}$ is supplied to the A-head play back amplifier 27A and the B-head play back amplifier 27B through the audio terminals AD of the video/audio switch circuits 26A and 26B and the play back terminals PB of the record/play back switch circuits 25A and 25B. The resulting reproduced data D3 and D4 from the play back amplifiers 27A and 27B are supplied to mode switch circuits 31A and 31B of a mode selector 31 included in the mode/head selector and equalizer circuit 28. The mode switch circuits 31A and 31B are switched in response to a mode selection signal L1 provided as one of the selection signals $S_{SEL}$ from the mode detect/control section 16. When the PCM audio signal $S_{AD}$ which is being played back or reproduced is of the standard quality, the mode switch circuits 31A and 31B are conditioned as shown on FIG. 2 so as to engage their respective terminals NR, with the result that the reproduced data D3 and D4 are respectively supplied to standard-quality A-head and B-head equalizer circuits 32 and 33, respectively. On the other hand, when the PCM audio signal $S_{AD}$ which is being reproduced is of the high-quality, the mode switch circuits 31A and 31B are changed-over by the signal L1 so as to engage their respective terminals HI and thereby supply the reproduced data D3 and D4 to high-quality A-head and B-head equalizer circuits 34 and 35, respectively.

It will be appreciated that, when there is a change from one to the other of the standard- and high-quality modes, or form one to the other of the A and B heads 12A and 12B of the apparatus 10, the audio data $S_{AD}$ which is recorded in, or reproduced from the audio track portions $TR_{AD}$ have different response characteristics with changes in frequency. Thus, the equalizer circuits 32, 33, 34 and 35 are provided to equalize the frequency characteristics of the reproduced data D3 and D4 picked up from the audio track portions $TR_{Ad}$ of the tracks TRA and TRB by the heads 12A and 12B, respectively, in the standard-quality reproducing mode and in the high-quality reproducing mode, respectively. By reason of the foregoing, a desirably low bit error rate can be maintained, that is, the so-called eye pattern opening of the two frequency signals $S_1$ and $S_2$ constituting the bi-phase mark can be increased to the greatest extend possible.

As further shown on FIG. 2, the mode/head selector and equalizer circuit 28 includes a head selector circuit 36 made up of head switch circuits 36A and 36B each having input terminals A and B. Output data D5 and D6 from the equalizer circuits 32 and 33 are supplied to the input terminals A and B of the head switch circuit 36A. Similarly, output data D7 and D8 from the equalizer circuits 34 and 35 are supplied to the input terminals A and B of the head switch circuit 36B. The moveable contacts of the head switch circuits 36A and 36B are suitably changed-over between the respective input terminals A and B in response to a head selection signal C5 included in the control signals $S_{CONT}$ from the system controller 100. The moveable contact or output of the head switch circuit 36A is connected to a standard-quality audio data detecting circuit 37 so that output data D5 or D6 from the equalizer 32 or 33, respectively, is supplied through head switch circuit 36A to the standard-quality audio data detecting circuit 37. Similarly, the output of the head switch circuit 36B is connected to a high-quality audio data detecting circuit 38 so that output data D7 or D8 from the equalizer circuit 34 or 35 is supplied to the high-quality audio data detecting circuit 38 through the head switch circuit 36B.

Figure 3:
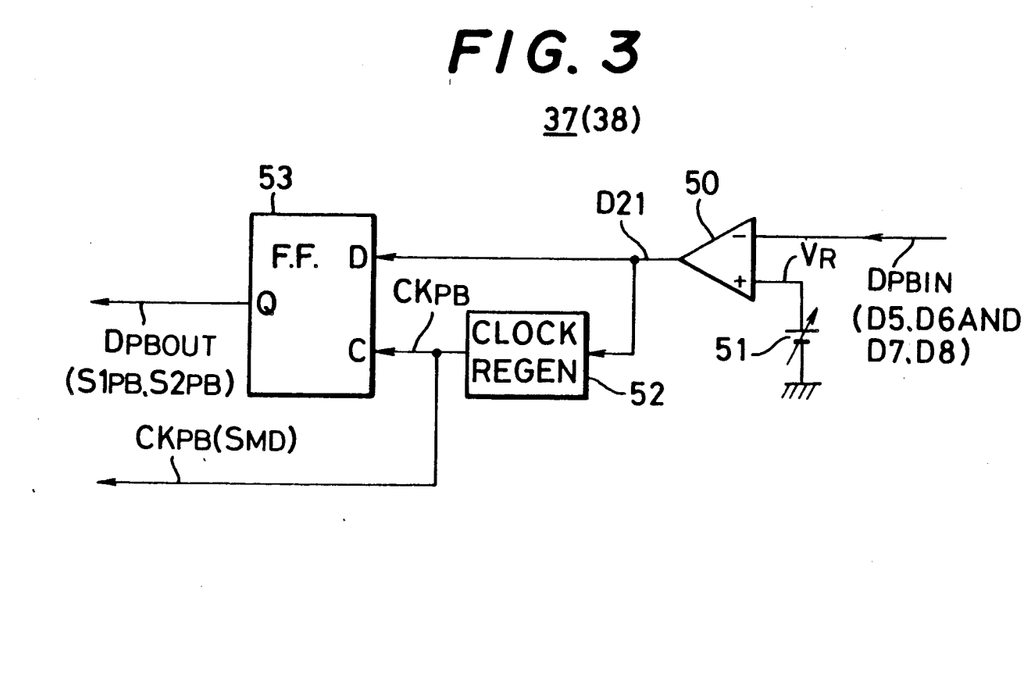
FIG. 3 is a block diagram showing a specific circuit arrangement that may be advantageously employed in of a plurality of digital audio data detection circuits included in FIG. 2.

As shown in FIG. 3, each of the standard- and high-quality audio data detecting circuits 37 and 38 includes a comparator 50 in which input data $D_{PBIN}$ (constituted by the data D5 or D6, or the data D7 or D8) supplied to the inverted input of the comparator 50 is compared with a zero cross reference voltage $V_R$ provided by a variable reference voltage source 51 and applied to a non-inverted input of the comparator 50. A data detection signal D21 is derived from the output of the comparator 50. Such data detection signal D21 is at a logic level "H" when the input data $D_{PBIN}$ is raised to a positive value exceeding 0, and the signal D21 attains a logic level "L" when the input data falls to a negative value. The data detection signal D21 is supplied to a clock signal regenerating circuit 52 having a phase locked loop (PLL) arrangement. The clock signal regenerating circuit 52 provides a detect clock signal $CK_{PB}$ which is phase-locked with the data detection signal D21 and is supplied to a clock input terminal C of a synchronization circuit 53 to serve the same function as the sampling pulse $P_S$ which has been described with reference to FIG. 8C. The clock signals $CK_{PB}$ is also supplied to the system controller 100 as a system clock, and to the mode detect/control section 16 as a PCM mode detection signal $S_{MD}$.

The synchronization circuit 53 is shown to be comprised of a D-type flip-flop circuit having the data detection signal D21 applied to its input terminal D. When the detection clock signal $CK_{PB}$ is supplied to the clock input terminal C of the flip-flop circuit 53, the latter is set or reset in response to the data detection signal D21 attaining the logic "H" or "L" level. The Q output of the flip-flop circuit 53 provides detection output data $D_{PBOUT}$ which, in the case of the standard-quality audio data detecting circuit 37, constitutes the first reproduced audio data $S1_{PB}$ and, in the case of the high-quality audio data detecting circuit 38 constitutes the second reproduced audio data $S2_{PB}$.

In the play back mode, the signal $S_{VD}$ picked up from the video track portion $TR_{VD}$ by the A and B heads 12A and 12B is input to the ATF signal processing section 15 and the mode detect/control section 16 (FIG. 1) through the video output terminals VD of the video/audio switch circuits 26A and 26B (FIG. 2) of the video/audio switch circuit 26.

Figure 4:
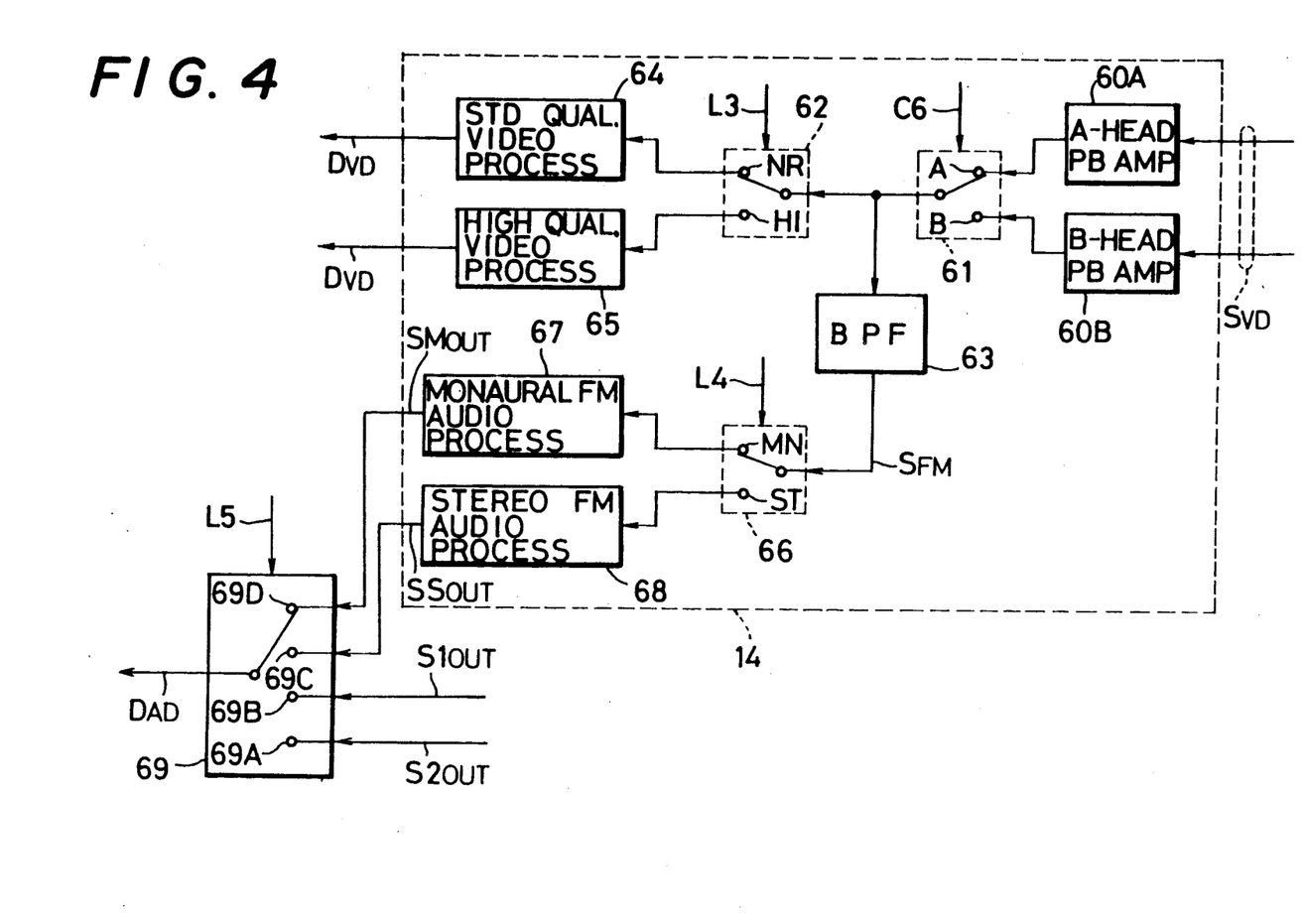
FIG. 4 is a block diagram showing details of a reproduced video signal processing section included in the apparatus of FIG. 1.

As shown in FIG. 4, the reproducing or playback system of the video signal processing section 14 supplies the input signal $S_{VD}$ to A-head and B-head input terminals A and B of a head selector circuit 61 through A-head and B-head play back amplifiers 60A and 60B. The head selector circuit 61 is switched in response to a head selection signal C6 supplied as one of the control signals $S_{CONT}$ from the system controller 100. The signal $S_{VD}$ obtained from the circuit 61 is input to a subsequent video mode selection switch circuit 62. In addition, the FM audio signals $S2V_M$ and $S2V_S$ shown on FIG. 9, and together comprising the FM audio signal $S_{FM}$ on FIG. 4, are extracted from the signal $S_{VD}$ through a band-pass filter 63 having for example, a pass band of 1.4 MHz to 1.8 MHz., and are input to an FM audio selection switch circuit 66.

The video mode selection switch circuit 62 is switched in response to a video mode selection signal L3 supplied as one of the selection signals $S_{SEL}$ from the mode detect/control section 16. When the standard-quality mode is selected by the video mode selection signal L3, the signal $S_{VD}$ is output to a standard-quality video signal processing circuit 64 through a standard-quality output terminal NR. In contrast to this, when the high-quality mode is selected by the signal L3 applied to the switch circuit 62, the signal $S_{VD}$ is output to a high-quality video signal processing circuit 65 through a high-quality output terminal HI.

The standard- and high-quality video signal processing circuits 64 and 65 each perform a respective predetermined playback processing of the input signal $S_{VD}$, and output the processed signal as output video data $D_{VD}$ (FIG. 4).

The FM audio mode selection switch circuit 66 is switched in response to an FM mode selection signal L4 supplied as one of the selection signals $S_{SEL}$ from the mode detect/control section 16. When a monaural FM audio mode is selected, the FM audio signal $S2V_M$ input to the switch circuit 66 is output to a monaural FM audio signal processing circuit 67 through a monaural FM output terminal MN of the switch circuit 66. When a stereo FM audio mode is selected, the FM audio signals $S2V_M$ and $S2V_S$ input to the switch circuit 66 are output to a stereo FM audio signal processing circuit 68 through a stereo FM output terminal ST of the switch circuit 66.

The monaural and stereo FM audio signal processing circuits 67 and 68 perform respective predetermined playback processing of the input FM audio signal $S2V_M$ and of the signals $S2V_M$ and $S2V_S$, respectively. The obtained stereo and monaural audio output signals $SS_{OUT}$ and $SM_{OUT}$ are output to input terminals 69C and 69D, respectively, of an audio selector circuit 69. Other terminals 69A and 69B of the audio selector circuit 69 receive audio output signals $S2_{OUT}$ and $S1_{OUT}$, respectively, obtained from the high- and standard-quality PCM audio signal processing circuits 22 and 21, respectively. The selector circuit 69 is switched in response to an audio selection signal L5 supplied as one of the selection signals $S_{SEL}$ from the mode detect/control section 16. At any time, one of the audio output signals $S1_{OUT}$ and $S2_{OUT}$ and the stereo and monaural audio output signals $SS_{OUT}$ and $SM_{OUT}$ supplied to the input terminals 69A, 69B, 69C and 69D of the selector circuit 69 is selected, and is output from the output terminal of the audio selector circuit 69 as output audio data $D_{AD}$.

As shown on FIG. 1, the mode detect/control section 16 receives the signal $S_{VD}$ picked up by the A and B heads 12A and 12B from the video track portion $TR_{VD}$ of each of the tracks TRA and TRB on the magnetic tape 1 and the PCM mode detection signal $S_{MD}$ obtained from the standard- and high-quality data detect circuits 37 and 38 (FIG. 2) of the mode/head selector and equalizer circuit 28. Based on these signals, $S_{VD}$ and $S_{MD}$, the mode detect/control section 16 detects the modes of the various audio and video signals recorded on the magnetic tape 1. On the basis of such detection, the mode detect/control section 16 provides the selection signals $S_{SEL}$ which, in combination with control signals $S_{CONT}$, select and control the playback modes of the PCM audio signal processing section 13 and the video signal processing section 14.

In the embodiment being described and as shown in FIG. 9, the standard-quality PCM audio signal $S_{ADNR}$ is of a first clock frequency $CK_{NR}$ (=11.6 MHz) and the alternatively used high-quality PCM audio signal $S_{ADHI}$ is of a second clock frequency $CK_{HI}$ (=14.8 MHz). Which ever PCM audio signal is used is recorded in the audio track portion $TR_{AD}$ of each record track on the magnetic tape 1. The standard-quality video signal includes a standard-quality FM luminance signal $S1V_N$ having a first center frequency of 5 MHz and a frequency range of 2 to 8 MHZ, and the alternatively used high-quality video signal includes a high-quality FM luminance signal $S1V_H$ having a second center frequency of 7 MHz and a frequency range of 2 to 12 MHz.

Further, in the embodiment being described, a multi-channel recording mode may be employed as a further function of the 8-mm format VTR. In such multi-channel mode, a plurality of channels of PCM audio signals are recorded using the full lengths of the recording tracks TRA and TRB consisting of the audio and video track portions $TR_{AD}$ and $TR_{VD}$ for the recording of such PCM audio signals. When the standard-quality PCM audio signal $S_{ADNR}$ is recorded as the PCM audio signal in the multi-channel recording mode, a first pilot signal $P_1$ of a first frequency, for example, of 230 kHz, which is higher than the frequency of the ATF signal $S_{ATF}$ is superposed thereon. When the high-quality PCM audio signal $S_{ADHI}$ is recorded in the multi-channel recording mode, a second pilot signal $P_2$ of a second frequency, for example, of 280 kHz, higher than that of the first pilot signal $P_1$ is superposed thereon.

Further, the monaural FM audio signal $S_2V_M$ has a first center frequency, for example, of 1.5 MHz, and is superposed as an FM audio signal on the video signal recorded in the video track portion $TR_{VD}$ of each of the record tracks on the magnetic tape 1. Alternatively, the stereo FM audio signal $S_2V_S$ uses the first center frequency signal, for example, of 1.5 MHz, as a main carrier, and a second center frequency signal, for example, of 1.7 MHz, as a subcarrier and is again superposed on the video signal recorded in each video track portion $TR_{VD}$.

The mode detect/control section 16, is adapted to detect the quality of the PCM audio signal, the presence or absence of the use of PCM multi-channel recording, the mode of the FM audio signal, and the quality of the video signal.

Figure 5:
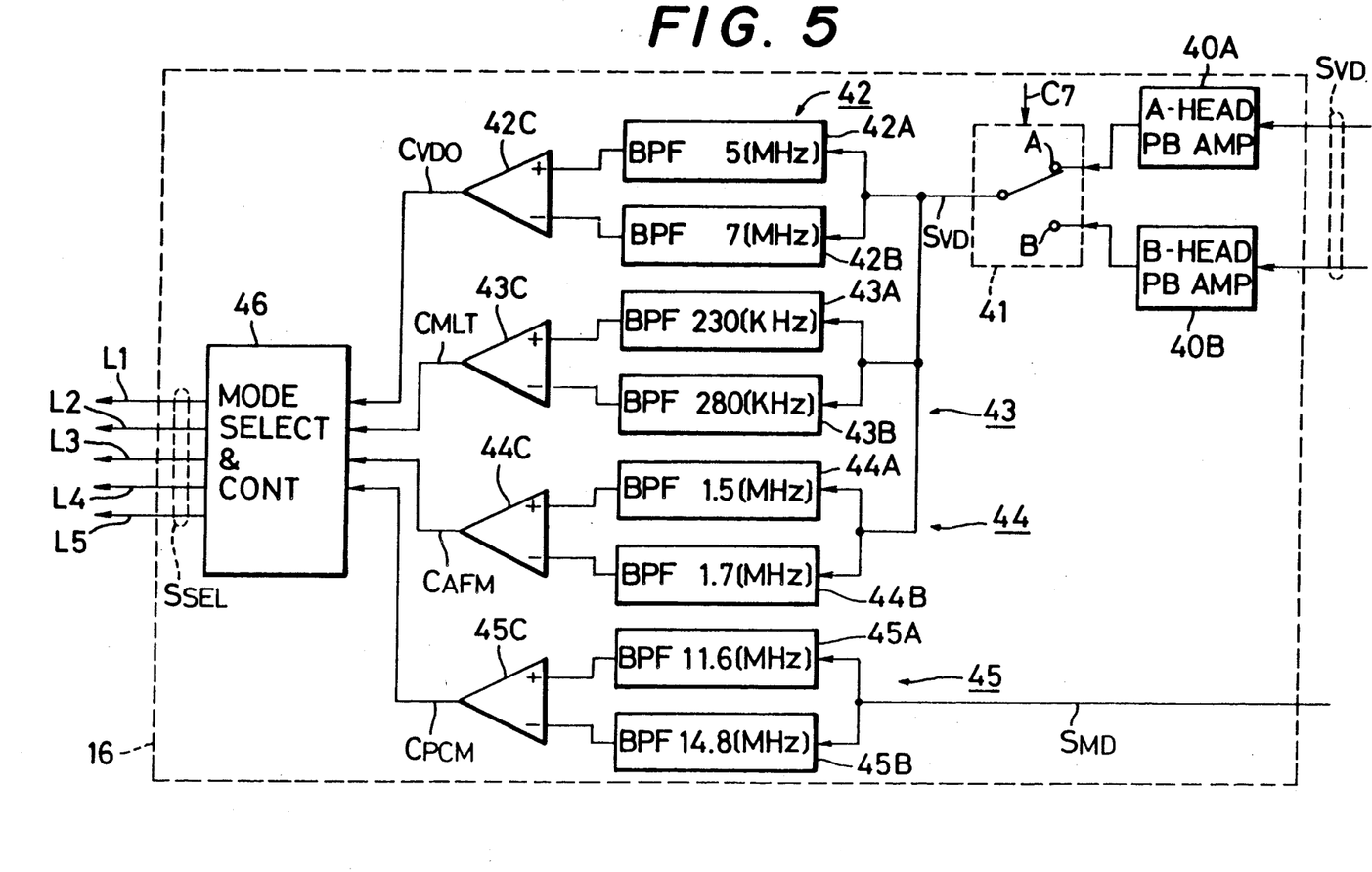
FIG. 5 is a block diagram showing details of a mode detecting and controlling section included in the apparatus of FIG. 1.

More specifically, in the mode detect/control section 16 as shown in FIG. 5, the input video signal $S_{VD}$ is supplied to A-head and B-head input terminals A and B of a head selector circuit 41 through A-head and B-head playback amplifiers 40A and 40B. The head selector circuit 41 is switched in response to a head selection signal C7 supplied as one of the control signals $S_{CONT}$ from the system controller 100, and the signal $S_{VD}$ obtained thereby is input to a video mode detect circuit 42, a PCM multi-mode detect circuit 43, and an FM audio mode detect circuit 44.

The video mode detect circuit 42 includes a first band-pass filter 42A having a pass band centered at 5 MHz and a second band-pass filter 42B having a pass band centered at 7 MHz and through which the input signal $S_{VD}$ is supplied to non-inverting and inverting input terminals, respectively, of a comparator 42C constituted by an operational amplifier. Thus, the video mode detect circuit 42 detects if the FM luminance portion of the signal $S_{VD}$ is recorded on the magnetic tape 1 in the standard- or high-quality mode. When the FM luminance portion of the signal $S_{VD}$ is recorded in the standard-quality mode, that is, with the center frequency of 5.0 MHz, the level of the signal $S_{VD}$ passing through the first band-pass filter 42A is higher than that passing through the second band-pass filter 42B. In this case, the output from the comparator 42C exhibits a positive level. In contrast to this, when the FM luminance portion of the signal $S_{VD}$ is recorded in the high-quality mode, that is, with the outer frequency of 7.0 MHz, the output from the comparator 42C exhibits a negative level. Thus, a video mode detection signal $C_{VDO}$ is obtained as the output from the comparator 42C and is supplied to a mode select/control circuit 46 which may comprise a microcomputer.

The PCM multi-mode detect circuit 43 includes a first band-pass filter 43A having a pass band centered at the frequency of 230 kHz and a second band-pass filter 43B having a pass band centered at the frequency of 280 kHz, and through with the input video signal $S_{VD}$ is supplied to non-inverting and inverting input terminals of a comparator 43C. The PCM multi-mode detect circuit 43 determines from the full recording tracks TRA and TRB, that is, from the audio and video track portions $TR_{AD}$ and $TR_{VD}$, whether or not the reproduced PCM audio signal was multi-channel recorded. When the signal is multi-channel recorded, the detect circuit 43 further detects, on the basis of the multi PCM pilot signal $P_1$ or $P_2$, which one of the standard- and high-quality modes is used to record the PCM audio signal.

When the multi PCM pilot signal $P_1$ of 230 kHz, indicating that multi-channel recording is performed using the standard-quality PCM audio signal, is included in the signal $S_{VD}$ only such pilot signal $P_1$ passing through the first band-pass filter 43A is input to the non-inverting input terminal of the comparator 43C. In this case, the output $C_{MLT}$ from the comparator 43C exhibits a positive level. When the multi PCM pilot signal $P_2$ of 280 kHz is included in the video signal $S_{VD}$, thereby indicating that multi-channel recording is performed using the high-quality PCM audio signal, only such pilot signal $P_2$ passing through the second band-pass filter 43B is input to the inverting input terminal of the comparator 43C. In this case, the output $C_{MLT}$ from the comparator 43C indicates a negative level. When the PCM audio signal is not multi-channel recorded, the output $C_{MLT}$ from the comparator 43C exhibits 0 level. A resulting PCM multi-mode detection signals $C_{MLT}$ from the comparator 43C is supplied to the mode select-/control circuit 46.

The FM audio mode detect circuit 44 includes a first band-pass filter 44A having a pass band centered at the frequency of 1.5 MHz and a second band-pass filter 44B having a pass band centered at a frequency of 1.7 MHz, and through which the input signal $S_{VD}$ is supplied to the non-inverting and inverting input terminals of a comparator 44C.

The FM audio mode detect circuit 44 detects the stereo or monaural mode of the FM audio signal recording in the video track portions $TR_{VD}$ of the record tracks on the magnetic tape 1 on the basis of the inclusion in the signal $S_{VD}$ of a carrier component of a monaural audio signal having a center frequency of 1.5 MHz, or the carriers of a stereo FM audio signal having center frequencies of 1.5 MHz and 1.7 MHz.

When the single carrier frequency of 1.5 MHz is included in the signal $S_{VD}$, only such portion of the signal $S_{VD}$ passing through the first band-pass filter 44A is input to the non-inverting input terminal of the comparator 44C. In this case, the output $C_{AFM}$ from the comparator 44C exhibits a positive level. When the carrier frequencies 1.5 MHz and 1.7 MHz of the stereo FM audio signal are included in the signal, portions of the signal $S_{VD}$ passing through the first and second band-pass filters 44A and 44B are input to the inverting and non-inverting input terminals of the comparator 44C. In this latter case, the output $C_{AFM}$ from the comparator 44C exhibits a zero level. The resulting FM audio mode detection signal $C_{AFM}$ of the output of the comparator 44C is supplied to the mode select/control circuit 46.

The PCM mode detection signals $S_{MD}$ from the standard and high-quality PCM audio data detect circuits 37 and 38 (FIG. 2) are supplied to the non-inverting and inverting input terminals, respectively, of a comparator 45C through a first band-pass filter 45A having a pass band centered at a frequency of 11.6 MHz and a second band-pass filter 45B having a pass band centered at a frequency of 14.8 MHz in the PCM audio mode detect circuit 45. Thus, the PCM audio mode detect circuit 45 detects the presence or absence of the PCM audio signal recorded in the audio track portions $TR_{AD}$ on the magnetic tape 1, and further detects use of the standard- or high-quality PCM audio signal on the basis of a clock frequency regenerated from the PCM audio signal which is being played back by the PCM audio signal processing section 13.

When the standard-quality PCM audio signal with a clock frequency of 11.6 MHz is recorded in the audio track portions $TR_{AD}$ on the magnetic tape 1, only the PCM mode detection signal $S_{MD}$ passing through the first band-pass filter 45A is input to the non-inverting input terminal of the comparator 45C. In this case, the output $C_{PCM}$ from the comparator 45C exhibits a positive level. When the high-quality PCM audio signal with a clock frequency of 14.8 MHz is recorded in the audio track portions $TR_{AD}$, only the PCM mode detection signal $S_{MD}$ passing through the second band-pass filter 45B is input to the inverting input terminal of the comparator 45C. In this case, the output $C_{PCM}$ from the comparator 45C exhibits a negative level. When no PCM audio signal is recorded, and hence none is reproduced, the output $C_{PCM}$ from the comparator 45C is at the 0 level. The resulting PCM audio mode detection signal $C_{PCM}$ at the output of comparator 45C is also supplied to the mode select/control circuit 46.

Figure 6:
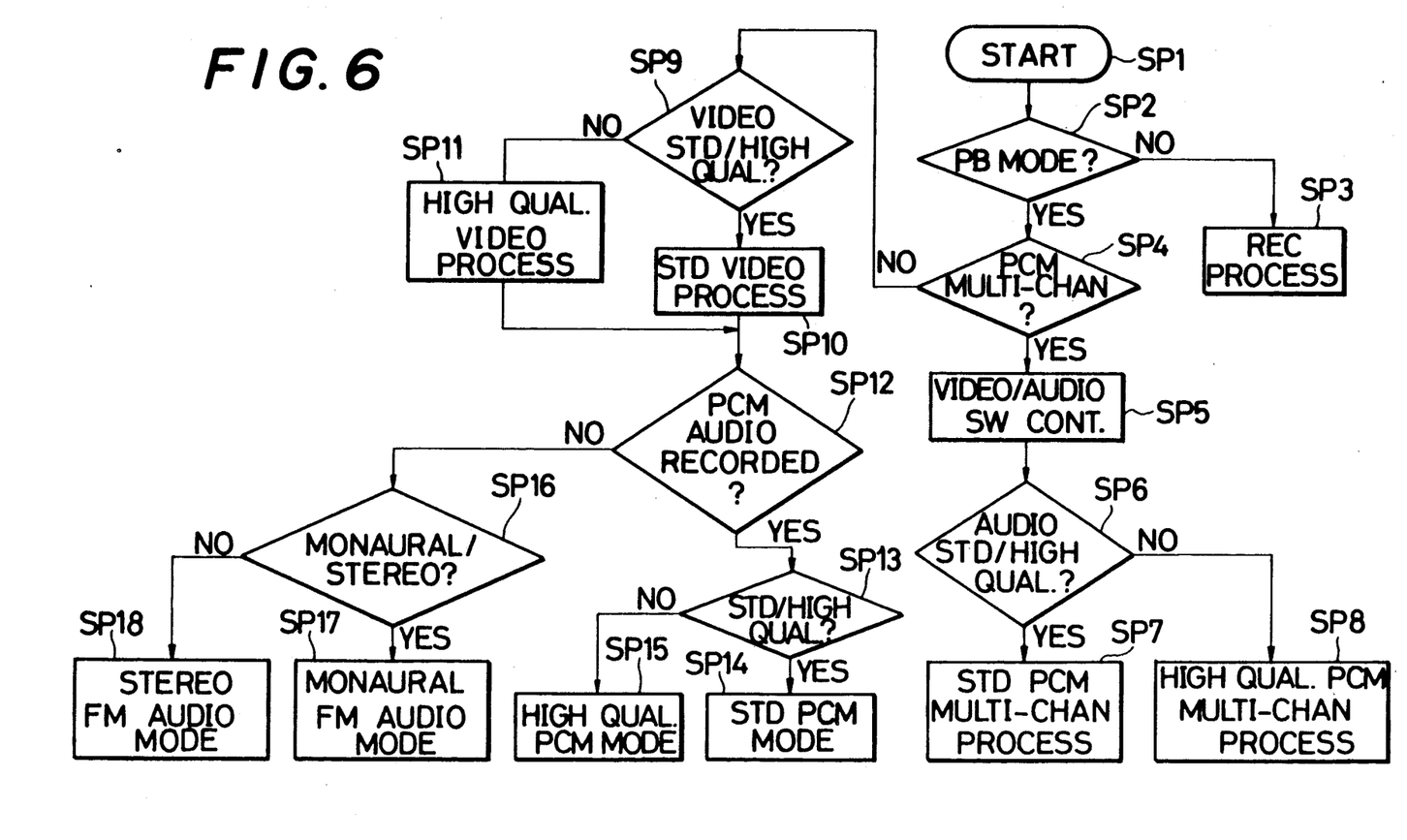
FIG. 6 is a flow chart illustrating a mode selection program executed by a controller or the like included in the section of the apparatus shown on FIG. 5.

The mode select/control circuit 46 which may be a CPU or microcomputer executes the mode selection program shown in FIG. 6 in response to the mode detection results included in the video mode detection signal $C_{VDO}$, the PCM multi-mode detection signal $C_{MLT}$, the FM audio mode detection signal $C_{AFM}$ and the PCM audio mode detection signal $C_{PCM}$ as obtained from the video mode detect circuit 42, the PCM multi-mode detect circuit 43, the FM audio mode detect circuit 44 and the PCM audio mode detect circuit 45, respectively, at the initiation of the operation of the data recording/playback apparatus 10.

The mode select/control circuit 46 starts its operation in step SP1. In step SP2, it is determined, for example, on the basis of the video mode detection signal $C_{VDO}$, if the present operation mode is the PB or reproducing mode. If the answer to step SP2 is NO, the program advances to step SP3, in which the mode select/control circuit 46 executes the recording operation.

If the answer to step SP2 is YES, the program proceeds to step SP4 in which, on the basis of the PCM multi-mode detection signal $C_{MLT}$, it is determined if PCM multi-channel recording is being used. If the answer is YES in step SP4, the circuit 46 sends the video/audio selection signal L2 to the system controller 100. In step SP5, in response to the video/audio selection signal L2, the system controller 100 determines the video/audio switch signal C4 by which the video/audio switch circuit 26 is made to continuously select the audio output terminals AD.

The mode select/control circuit 46 determines, in step SP6 on the basis of the PCM multi-mode detection signal $C_{MLT}$ or the PCM audio mode detection signal $C_{PCM}$, whether PCM multi-channel recording is being performed with the standard- or high-quality PCM audio signal $S_{ADNR}$ or $S_{ADHI}$.

When the answer to step SP6 is YES, that is, when PCM multi-channel recording is performed with the standard-quality PCM audio signal $S_{ADNR}$, the mode select/control circuit 46 supplies the mode selection signal L1 to the mode selector circuit 31, for selecting the standard-quality mode output terminals NR of the mode switch circuits 31A and 31B (FIG. 2). The circuit 46 further determines the audio selection signal L5 applied to the audio selection circuit 69 in order to select the input terminal 69B (FIG. 4) which receives the first audio signal $S1_{OUT}$ obtained from the standard-quality audio signal processing circuit 21 (FIG. 1). Thus, the data recording/playback apparatus 10 performs standard-quality PCM multi-channel processing.

When PCM multi-channel recording is performed with the high-quality PCM audio signal, the answer in step SP6 is NO. Therefore, the program proceeds to step SP8, and the circuit 46 determines the mode selection signal L1 for selecting the high-quality mode output terminals HI of the mode switch circuits 31A and 31B of the mode selector circuit 31 (FIG. 2). The circuit 46 further determines selection signal L5 in order to select the input terminal 69A of selection circuit 69 which receives the audio signal $S2_{OUT}$ obtained from the high-quality audio signal processing circuit 22 (FIG. 4). Thus, the data recording/playback apparatus 10 performs high-quality PCM multi-channel processing.

When PCM multi-channel recording is not employed, the answer in step SP4 is NO and the program advances to step SP9. In step SP9, the mode select/control circuit 46 determines, on the basis of the video mode detection signal $C_{VDO}$, if a standard-or high-quality video signal is being used.

When the standard-quality video signal is being used, the answer in step SP9 is YES and the program proceeds to step SP10. In the step SP10, the circuit 46 determines the video mode selection signal L3 for selecting the standard-quality mode output terminal NR of the video mode selection switch circuit 62 in the video signal processing section 14 (FIG. 4). Therefore, the data recording/playback apparatus 10 plays back the video signal using the standard-quality video signal processing circuit 64.

When the high-quality video signal is being used, the answer in step SP9 is NO, and the flow then advances to step SP11. In step SP11, the mode select/control circuit 46 determines the video mode selection signal L3 supplied to the video mode selection switch circuit 62 of the video signal processing section 14, in order to select the high-quality output terminal HI. Therefore, the data recording/playback apparatus 10 play back the video signal using the high-quality video signal processing circuit 65.

The mode select/control circuit 46 then determines, in step SP12 whether, on the basis of the PCM audio mode detection signal $C_{PCM}$ (FIG. 5), a PCM audio signal $S_{ADNR}$ or $S_{ADHI}$ is recorded in the audio track portion $TR_{AD}$ of the magnetic tape 1.

When the PCM audio signal $S_{ADNR}$ or $S_{ADHI}$ is used, the answer is step SP12 is YES and the flow advances to step SP13. In step SP13, the mode select/control circuit 46 determines, on the basis of the PCM audio mode detection signal $C_{PCM}$, if the standard- or high-quality PCM audio signal $S_{ADNR}$ or $S_{ADHI}$ is being used. If the answer in step SP13 is YES, that is, if the standard-quality PCM audio signal is being used, the flow advances to step SP14. In step SP14, the circuit 46 determines the mode selection signal L1 supplied to the mode selection switch circuits 31A and 31B (FIG. 2) of the mode selector circuit 31 in the mode/head selector and equalizer circuit 28 in order to selector the standard-quality mode output terminals NR. The circuit 46 further determines the audio selection signal L5 supplied to the audio selector circuit 69 in order to select the input terminal 69B which receives the first audio signal $S1_{OUT}$ obtained form the standard-quality audio signal processing circuit 21. Thus, the PCM audio signal processing section 13 plays back the standard-quality PCM audio signal $S_{ADNR}$.

If the answer in step SP13 is NO, that is, if the high-quality PCM audio signal is being used, the flow advances to step SP15, and the circuit 46 determines the mode selection signal L1 supplied to the mode selection switch circuits 31A and 31B (FIG. 2) of the mode selector circuit 31 in order to select the high-quality mode output terminal HI. The circuit 46 further determines the audio selection signal L5 supplied to the audio selector circuit 69 in order to select the input terminal 69A which receives the second audio signal $S2_{OUT}$ obtained from the high-quality audio signal processing circuit 22. Thus, the PCM audio signal processing section 13 plays back the high-quality PCM audio signal $S_{ADHI}$.

If the answer in step SP12 is NO, the circuit 46 determines in step SP16, on the basis of the FM audio mode detection signal $C_{AFM}$, if an FM audio signal superposed on the video signal recorded in the video track portions $TR_{VD}$ on the magnetic tape 1 is a monaural or stereo audio signals $S2V_M$ or $S2V_M$ and $S2V_S$. If the answer is YES in step SP16, that is, if a monaural FM audio signal is recorded in the track portions $TR_{VD}$, the circuit 46 supplies an FM mode selection signal L4 to the FM audio mode selection switch circuit 66 of the video signal processing section 14 (FIG. 4) in order to select the monaural FM output terminal MN. The circuit 46 also determines the audio selection signal L5 supplied to the audio selector circuit 69 in order to select the input terminal 69D which receives the monaural audio output signal $SM_{OUT}$ obtained from the monaural FM audio signal processing circuit 67. Thus, the video signal processing section 14 plays back the FM audio signal $S2V_M$ using the monaural FM audio signal processing circuit 67.

If the answer in step SP16 is no, that is, if a stereo FM audio signal is recorded in the track portions $TR_{VD}$, the flow advances to step SP18. In step SP18, circuit 46 determines the FM mode selection signal L4 supplied to the FM audio mode section switch circuit 66 (FIG. 4) of the video signal processing section 14 in order to select the stereo FM output terminal ST. The circuit 46 also determines the audio selection signal L5 supplied to the audio selector circuit 69 in order to select the input terminal 69C which receives the stereo audio output signal $S_{SOUT}$ obtained from the stereo FM audio signal processing circuit 68. Thus, the video signal processing section 14 plays back the input FM audio signal using the stereo FM audio signal processing circuit 68.

In the above described mode selection processing program, the mode select/control circuit 46 gives priority to mode detections indicating higher sound quality when determining the audio selection signal L5 to be supplied to the audio selector circuit 69. Thus, for example, if both PCM and FM audio signals are reproduced, the PCM audio signal which has relatively higher sound quality is selected by causing signal L5 to select the input terminal 69A of the circuit 69.

By way of example, with the above arrangement, when a magnetic tape 1 on which a standard-quality video signal and a high-quality PCM audio signal are recorded is to be played back the video mode detect circuit 42 and the PCM audio mode detect circuit 45 of the mode detect/control section 16 detect these signals. The circuit 46 executes steps SP2, SP4, SP9, SP10, SP12, SP13 and SP14 starting from the initial step SP1 of the mode selection processing program. In response to such mode selection program, the PCM audio signal processing section 13 and the video signal processing section 14 play back the audio signal $S_{AD}$ and the video by suitable playback processes performed in processing circuits 22 and 64, respectively.

On the other hand, when a magnetic tape 1 on which a high-quality video signal and a stereo FM audio signal are recorded is to be played back, the circuit 46 executes steps SP2, SP4, SP9, SP11 SP12, SP16 and SP18 starting from the initial step SP1 of the mode selection processing program. In such case, the PCM audio signal processing section 13 is inoperative and the video signal processing section 14 plays back the high-quality video signal and the accompanying stereo FM signal through the processing circuits 65 and 68, respectively.

In the data recording/playback apparatus 10, the mode detect/control section 16 detects the picture quality of the video signal recorded on the magnetic tape 1 which is being played back, the nature of the FM audio signals, the presence or absence of PCM multi-channel recording, the sound quality of PCM multi-channel recording if any, and the sound quality of the PCM audio signal recording if any. As a result of such detections, the playback processes of the PCM audio signal processing section 13 and the video signal processing section 14 are automatically selected. Therefore, a user can conveniently play back a magnetic tape by the best playback process regardless of the modes used in recording such tape.

In the above description of the invention, it has been stated that there may be used for recording an FM luminance signal having a center frequency of 5 or 7 MHz, a PCM audio signal with a clock signal of 11.6 or 14.8 MHz, a PCM multi-channel recording pilot signal with a frequency of 230 or 280 kHz, and an FM audio signal having a center frequency of 1.5 or 1.7 MHz, as shown in FIG. 9, and all these signals are detected upon play back in the apparatus 10. However, the frequencies of these signals are not limited to the noted values. The band-pass frequency characteristics of the band-pass filters of 42A, 42B, 43A, 43B, 44A, 44B, 45A and 45B of the mode detect/control section 16 may be selected in accordance with the frequencies of the recorded signals, thus obtaining the same effects as in the specifically described embodiment.

In the above described embodiment, the bi-phase-mark modulation method and an 8-10 modulation process are employed for the PCM audio signal. However, the present invention is not limited to the specified modulation process, and may be applied to any other arrangement in which digital data having different recording densities are selectively recorded or played back.

Further, in the described embodiment, magnetic tape is used as a recording medium, but it will be appreciated that other recording media, such as a magnetic disk, may be employed.

Further, in the described embodiment, the invention is described as being applied to the recording and play back of a PCM audio signal by an 8-mm VTR. However, the invention may be widely applied to other apparatus wherein magnetic recording media having different recording densities of digital signals may be played back with enhanced compatibility.

Having described a specific embodiment of the invention with reference to the accompany drawing, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing an information signal recorded in a plurality of successive parallel tracks on a record medium and comprised of a video signal and at least one audio signal from the group of a frequency-modulated monaural audio signal, frequency-modulated stereo audio signals, a standard digitized audio signal and a high-quality digitized audio signal, with the video signal and the frequency-modulated audio signals being recorded only in a main section of each track and the digitized audio signals being recorded at least in an overscan section of each track, said apparatus comprising:

transducer means for scanning said tracks to reproduce said information signal recorded in said successive parallel tracks;
    separation means for separating a signal reproduced during scanning of the main section of each track by said transducer means and a signal reproduced during scanning of the overscan section of each track by said transducer means;
    frequency-modulated monaural audio signal processing means connected to said separation means for receiving said signal reproduced during scanning of said main section of each track and having an output;
    frequency-modulated stereo audio signal processing means connected to said separation means for also receiving said signal reproduced during scanning of said main section of each track and having an output;
    standard digitized audio signal processing means connected to said separation means for receiving at least said signal reproduced during scanning of said overscan section of each track and having an output;
    high-quality digitized audio signal processing means connected to said separation means for also receiving at least said signal reproduced during scanning of said overscan section of each track and having an output;
    frequency-modulated audio signal detecting means connected to said separation means for detecting whether said signal reproduced during said scanning of the main section of each track includes said frequency-modulated monaural audio signal or said frequency-modulated stereo audio signals;
    digitized audio signal detecting means for detecting whether said signal reproduced during scanning of said overscan section of each track includes said standard digitized audio signal or said high-quality digitized audio signal, said digitized audio signal detecting means being connected between said separation means and said standard and high-quality digitized audio signal processing means;
    selecting and controlling means for selecting an audio signal from among said frequency-modulated monaural audio signal, said frequency-modulated stereo audio signal, said standard digitized audio signal and said high-quality digitized audio signal, in response to said frequency-modulated audio signal detecting means and said digitized audio signal detecting means;
    audio output means; and
    switching means controlled by said selecting and controlling means for selectively connecting said outputs of said frequency-modulated monaural audio signal processing means, said frequency-modulated stereo audio signal processing means, said standard digitized audio signal processing means and said high-quality digitized audio signal processing means to said audio output means.

2. Apparatus according to claim 1; in which said selecting and controlling means selects said high-quality digitized audio signal when said digitized audio signal detecting means detects said high-quality digitized audio signal in said signal reproduced during said scanning of the overscan section.

3. Apparatus according to claim 2; in which said selecting means selects said standard digitized audio signal when said digitized audio signal detecting means detects said standard digitized audio signal.

4. Apparatus according to claim 1; in which said high quality digitized audio signal has a higher sampling clock frequency than said standard digitized audio signal, and said digitized audio signal detecting means detects said sampling clock frequency.

5. Apparatus according to claim 4; in which said digital audio signal detecting means has first and second band-pass filters having respective center frequencies corresponding to said sampling clock frequencies of said standard digitized audio signal and said high-quality digitized audio signal, respectively.

6. Apparatus according to claim 4; in which said frequency-modulated monaural audio signal has a first carrier, said frequency-modulated stereo audio signals have said first carrier and a second carrier, and said frequency-modulated audio signal detecting means detects said first and second carriers.

7. Apparatus according to claim 6; in which said frequency-modulated audio signal detecting means has first and second band-pass filters having respective center frequencies corresponding to frequencies of said first and second carriers, respectively.

8. Apparatus according to claim 1; in which said video signal includes either a frequency-modulated standard video signal having a first FM video center frequency or a frequency-modulated high-quality video signal having a second FM video center frequency higher than said first center frequency, and said apparatus further comprises:
frequency-modulated standard video signal processing means connected to said separation means for receiving said signal reproduced during scanning of said main section of each track and having an output;
frequency-modulated high-quality video signal processing means connected to said separation means for also receiving said signal reproduced during scanning of said main section of each track and having an output;
video signal detecting means for detecting whether said video signal is said frequency-modulated standard video signal or said frequency-modulated high-quality video signal, said video signal detecting means being connected between said separation means and said selecting and controlling means;
video output means; and
second switching means for switching a video signal by selectively connecting said outputs of said frequency-modulated standard video signal processing means and said frequency-modulated high-quality video signal processing means to said video output means, said second switching means being controlled by said selecting and controlling means.

9. Apparatus according to claim 8; in which said video signal detecting means detects said first and second FM video center frequencies.

10. Apparatus according to claim 9; in which said video signal detecting means has first and second band-pass filters having pass bands centered at said first FM video center frequency and said second FM video center frequency, respectively.

11. Apparatus according to claim 8; in which said information signal includes a multi-track digitized audio signal recorded on multiple portions of said main section of each track as either said standard digitized audio signal or said high-quality digitized audio signal, a first pilot signal indicative of a multi-track standard digitized audio signal and a second pilot signal indicative of a multi-track high quality digitized audio signal, and said apparatus further comprises:
multi-track mode detecting means for detecting said multi-track digitized audio signals by detecting said first and second pilot signals, said multi-track detecting means being connected to said separation means; and
in which said separation means are controlled by said selecting and controlling means so as to selectively supply the signals reproduced during scanning of said main section and said overscan section to said standard digitized audio signal processing means and to said high-quality digitized audio signal processing means when said first and second pilot signals, respectively, are detected.

12. Apparatus according to claim 11; in which said multi-track mode detecting means includes first and second band-pass filters having center frequencies corresponding to the frequencies of said first and second pilot signals, respectively.

* * * * *